United States Patent
Xu

(10) Patent No.: US 9,203,671 B2
(45) Date of Patent: Dec. 1, 2015

(54) 3D MEMORY BASED ADDRESS GENERATOR FOR COMPUTATIONALLY EFFICIENT ARCHITECTURES

(71) Applicant: Altera Corporation, San Jose, CA (US)

(72) Inventor: Lei Xu, High Wycombe (GB)

(73) Assignee: Altera Corporation, San Jose, CA (US)

( * ) Notice: Subject to any disclaimer, the term of this patent is extended or adjusted under 35 U.S.C. 154(b) by 433 days.

(21) Appl. No.: 13/648,443

(22) Filed: Oct. 10, 2012

(65) Prior Publication Data

US 2014/0101409 A1    Apr. 10, 2014

(51) Int. Cl.
G06F 12/06 (2006.01)
H04L 27/26 (2006.01)
G06F 17/14 (2006.01)

(52) U.S. Cl.
CPC ............ *H04L 27/263* (2013.01); *G06F 17/142* (2013.01); *G06F 12/06* (2013.01); *G06F 12/0623* (2013.01)

(58) Field of Classification Search
CPC ... G06F 12/06; G06F 17/142; G06F 12/0623; H04L 27/263
USPC .......................................... 711/217, E12.078
See application file for complete search history.

(56) References Cited

U.S. PATENT DOCUMENTS

| | | | | |
|---|---|---|---|---|
| 6,051,179 A * | 4/2000 | Hagenau | | 264/401 |
| 6,628,819 B1 * | 9/2003 | Huang et al. | | 382/154 |
| 7,894,229 B2 * | 2/2011 | Lahtinen et al. | | 365/51 |
| 8,689,082 B2 * | 4/2014 | Oh et al. | | 714/773 |
| 2002/0006217 A1 * | 1/2002 | Rubbert et al. | | 382/131 |
| 2004/0125103 A1 * | 7/2004 | Kaufman et al. | | 345/419 |
| 2005/0062747 A1 * | 3/2005 | Tuomi | | 345/506 |
| 2006/0170672 A1 * | 8/2006 | Tanaka et al. | | 345/419 |
| 2008/0284798 A1 * | 11/2008 | Weybrew et al. | | 345/630 |
| 2008/0316501 A1 * | 12/2008 | Hirata et al. | | 356/601 |
| 2011/0309475 A1 * | 12/2011 | Lee | | 257/532 |
| 2012/0007951 A1 * | 1/2012 | Fogel | | 348/43 |
| 2013/0182483 A1 * | 7/2013 | Zhang | | 365/51 |
| 2013/0188415 A1 * | 7/2013 | Zhang | | 365/148 |
| 2014/0040592 A1 * | 2/2014 | Fleischer et al. | | 711/203 |

* cited by examiner

*Primary Examiner* — Mardochee Chery
(74) *Attorney, Agent, or Firm* — Ropes & Gray LLP

(57) ABSTRACT

Systems and methods are disclosed for reducing memory usage and increasing the throughput in variable-size Fast Fourier Transform (FFT) architectures. In particular, 3D symmetric virtual memory is disclosed to exploit the structure inherent in variable-size FFT computations. Data samples may be written to and read from the 3D symmetric virtual memory in a specific sequence of coordinates that exploits the structure inherent in variable-size FFT computations. Memory locations in the 3D symmetric virtual memory may be mapped to memory address in a 1D buffer using an address generation circuit.

20 Claims, 11 Drawing Sheets

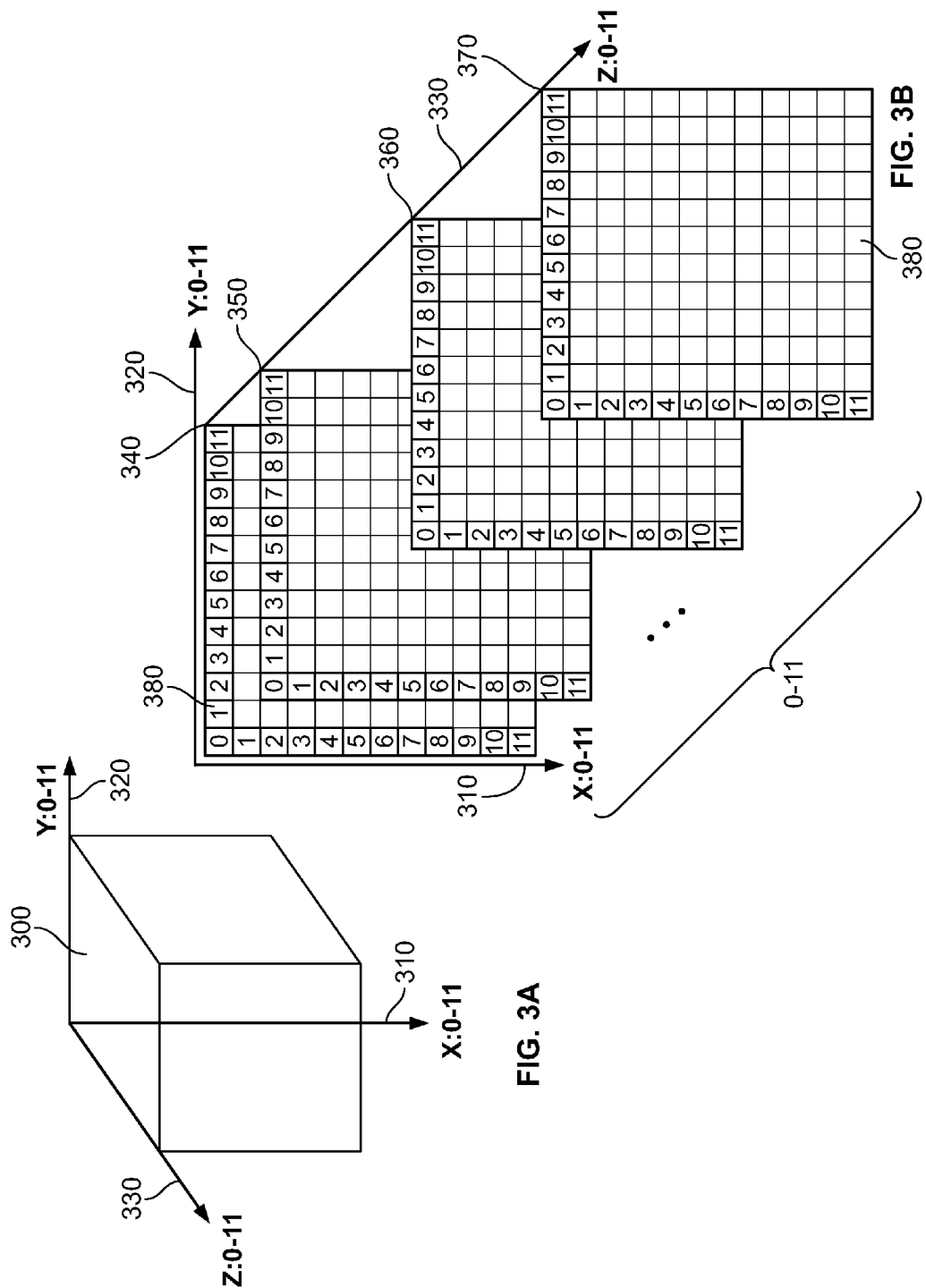

FIG. 5B (Cont.)

Write After Stage 1 ← 550

```
  0    144   288   432   576   720   864  1008  1152  1296  1440  ← 552
1584    1    145   289   433   577   721   865  1009  1153  1297
1441  1585    2    146   290   434   578   722   866  1010  1154
1298  1442  1586    3    147   291   435   579   723   867   1011
1155  1299  1443  1587    4    148   292   436   580   724   868
1012  1156  1300  1444  1588    5    149   293   437   581   725
 869  1013  1157  1301  1445  1589    6    150   294   438   582
 726   870  1014  1158  1302  1446  1590    7    151   295   439
 583   727   871  1015  1159  1303  1447  1591    8    152   296
 440   584   728   872  1016  1160  1304  1448  1592    9    153
 297   441   585   729   873  1017  1161  1305  1449  1593   10
 154   298   442   586   730   874  1018  1162  1306  1450  1594
  11   155   299   443   587   731   875  1019  1163  1307  1451
1595
```

Read for Stage 2 ← 560

3D MEMORY BASED ADDRESS GENERATOR FOR COMPUTATIONALLY EFFICIENT ARCHITECTURES

BACKGROUND OF THE DISCLOSURE

This disclosure relates to systems and methods for reducing memory usage and increasing the throughput in variable-size Fast Fourier Transform (FFT) architectures.

3GPP Long Term Evolution (LTE) is a wireless communication standard that supports high-speed wireless communications. LTE is a communication standard that is based on both Single-Carrier Frequency Division Multiplexing (SC-FDM) and Orthogonal Frequency Division Multiplexing (OFDM) algorithms that make heavy utilization of FFTs like the variable-size Discrete Fourier Transform (DFT) or the Inverse Discrete Fourier Transform (IDFT).

An FFT calculation includes reading an input data sequence with data samples x[n], n=0, ..., N−1, where N is the length of the input data sequence, and outputting the frequency domain FFT data sequence with data samples X[k], k=0, ..., N−1. Such a calculation is conventionally called an N-point FFT. FFT algorithms use a divide and conquer approach to reduce the computational complexity of calculating an FFT. For example, the Cooley-Tukey algorithm recursively decomposes the problem of calculating the FFT into two sub-problems of half the size (i.e., N/2) at every intermediate pass. The size of the FFT decomposition is known as the radix. In the above example, the radix is 2. This decomposition approach generally works for any radix k provided that N is a power of k. Thus, calculating an FFT typically involves making a number of passes (also referred to as stages) over the input data sequence and intermediate results. In general, each pass can be associated with a different radix.

The LTE standard commonly uses FFT algorithms with radix R=2, 3, 4, or 5. As an example, consider the calculation of a 64-point FFT using the radix R=4. For computing the FFT, an FFT processor conventionally processes the input data sequence in the order where the indices corresponding to the data samples are arranged in the following order:
00, 16, 32, 48, 01, 17, 33, 49, 02, 18, 34, 50, 03, 19, 35, 51, 04, 20, 36, 52, ..., 15, 31, 47, 63.
This order of data samples is referred to as a radix-reversed order. In the first pass of the FFT calculation, data samples corresponding to indices 00, 16, 32, and 48 are used to compute a first radix-4 butterfly; data samples corresponding to indices 01, 17, 33, and 49 are used to compute the next radix-4 butterfly; and so on. An FFT butterfly is a portion of the FFT calculation that breaks up the larger FFT calculation into smaller sub-transform calculations.

It has been noted that variable-size DFT/IDFT implementations often require high memory usage and suffer from low throughput. Accordingly, it is beneficial to have architectures capable of performing DFT/IDFT computations efficiently. If efficient architectures for performing such computations are not available, DFT/IDFT computations may become a bottleneck preventing LTE based communication schemes from operating optimally.

Some current variable-size DFT/IDFT implementations utilize dual processing cores in order to meet LTE throughput requirements. Some current variable-size DFT/IDFT implementations additionally utilize double dual port memory to meet the memory usage requirements. For example, some variable-size DFT/IDFT implementations utilize a ping-pong buffer which includes two separate storage arrays arranged in a configuration that allows reading and writing of data to occur in parallel. In particular, each storage array may have an independent data bus that may, in a first time period, enable data to be written to the first storage array while data is being read from the second storage array. In a second time period, data may be read from the first storage array while data is written to the second storage array. In subsequent time periods, the reading and writing of data to each storage array may alternate in the manner described above.

However, utilizing a ping-pong buffer comes with the cost of increased memory requirements, i.e., more memory is required than if a single storage array was utilized. Therefore, it would be desirable to have methods and systems for performing variable-size FFTs efficiently without increasing memory requirements.

SUMMARY OF THE DISCLOSURE

To address the above and other shortcomings within the art, the present disclosure provides methods and systems for reducing memory usage and increasing the throughput in variable-size Fast Fourier Transform (FFT) architectures.

In an embodiment, the system includes a buffer operable to store data samples that may be operated upon to compute an FFT. Memory locations in the buffer may be mapped to a 3D symmetric virtual memory operable to exploit the structure inherent in variable-length FFT computations. The system may include address generator circuitry operable to map memory locations in the 3D symmetric virtual memory to the buffer.

In an embodiment, the system may include a fixed-length streaming processing engine operable to compute fixed-length FFTs, a variable-length processing engine operable to compute variable-length FFTs, and the buffer for storing initial, intermediate, and/or final results of the FFT computations. The buffer may be abstracted as a 3D symmetric virtual memory.

In an embodiment, data samples may be written to and read from the 3D symmetric virtual memory in a specific coordinate sequence. For example, data samples may initially be written to the 3D symmetric virtual memory first along the Y coordinate, followed by the X and Z coordinates respectively. Data samples may then be read from the 3D symmetric virtual memory in the same coordinate sequence. In addition, as particular memory slices of the 3D symmetric virtual memory are released, i.e., data samples are read from them, other data samples may be written to the released memory slices. The coordinate sequence in which data samples may be written to the 3D symmetric virtual memory may be first along the X coordinate, followed by the Z and Y coordinates respectively. Data samples may then be read from the 3D symmetric virtual memory in the same coordinate sequence. Next, data samples may be written to the 3D symmetric virtual memory first along the Z coordinate, followed by the Y and X coordinates respectively. Data samples may then be read from the 3D symmetric virtual memory in the same coordinate sequence. The order in which data samples are written to and read from the 3D symmetric virtual memory may then be repeated starting from the coordinate sequence where data samples are first written along the Y coordinate, followed by the X and Z coordinates respectively.

In an embodiment, an address generator circuit may be operable to convert indices of memory locations in the 3D symmetric virtual memory to memory addresses in the buffer. The address generator circuit may include cyclic counters and additional circuitry operable to assist in the conversion of memory locations in the 3D symmetric virtual memory to memory addresses in the buffer. The address generator circuit may be dynamically reconfigurable under the control of a state machine to compute memory addresses in the buffer based on the coordinate sequence in which data samples are being read from or written to the 3D symmetric virtual memory.

BRIEF DESCRIPTION OF THE DRAWINGS

Further features of the disclosure, its nature and various advantages will be apparent upon consideration of the following detailed description, taken in conjunction with the accompanying drawings, in which like reference characters refer to like parts throughout, and in which:

FIGS. 3A and 3B are simplified block diagrams of a 3D memory, according to an illustrative embodiment;

FIGS. 5A, 5B, and 5C are simplified tables showing the manner in which data may be read from and written to a 3D memory, according to an illustrative embodiment;

DETAILED DESCRIPTION OF THE INVENTION

To provide an overall understanding of the invention, certain illustrative embodiments will now be described. However, it will be understood by one of ordinary skill in the art that the systems and methods described herein may be adapted and modified as is appropriate for the application being addressed and that the systems and methods described herein may be employed in other suitable applications, and that such other additions and modifications will not depart from the scope hereof.

Figure 1:
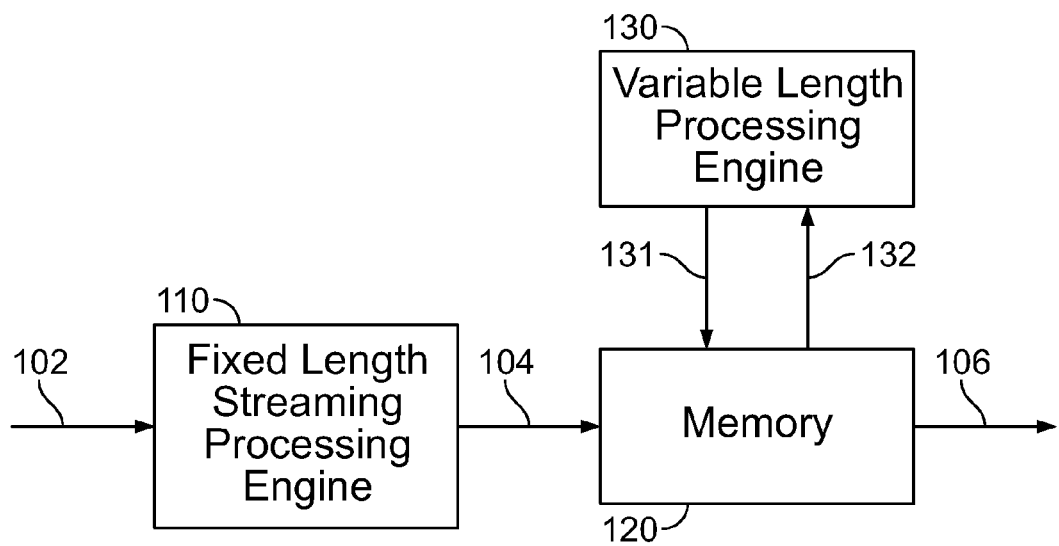
FIG. 1 is a simplified block diagram of an efficient FFT computation architecture, according to an illustrative embodiment.

FIG. 1 is a simplified block diagram of an efficient FFT computation architecture, according to an illustrative embodiment. In some embodiments, at least some components of the FFT computation architecture may be located on an integrated circuit, an application-specific integrated circuit (ASIC), an application-specific standard product (ASSP), a Programmable Logic Device (PLD), a Field Programmable Gate Array (FPGA), a full-custom chip, or a dedicated chip. It should also be understood that the FFT computation architecture may be located on a combination of devices, such as a FPGA and an ASIC, and/or may include additional, stand-alone circuit components.

The FFT computation architecture may include fixed length streaming processing engine 110, memory 120, and variable length processing engine 130. Fixed length streaming processing engine 110 may be operative to receive a streaming input in a symbol-reversed order via bus 102. Fixed length streaming processing engine 110 may be connected to memory 120 via line 104. Memory 120 may be connected to variable length processing engine 120 via buses 131 and 132. Memory 120 may be operative to output data via bus 106. Memory 120 is described in greater detail below in connection with FIG. 2.

Fixed length streaming processing engine 110 may be circuitry operative to perform fixed length FFT computations which have a constant size of points for the data frames whose FFT is being calculated. Fixed length streaming processing engine 110 may include multiple butterfly circuits and shift registers (not shown). In some implementations, fixed length streaming processing engine 110 may store intermediate computation values and/or results of the fixed length FFT computation in memory 120 using bus 104.

Variable length processing engine 130 may be circuitry operative to perform variable length FFT computations where the size of different frames for the FFT calculation is variable (normally a multiple of an element of a common radix set). In some implementations, there may be multiple variable length processing engines (not shown) operating in parallel. Variable length processing engine 130 may store intermediate computation values and/or results of the variable length FFT computation in memory 120 using buses 131 and 132. In some implementations, fixed length streaming processing engine 110 and variable length processing engine 130 may be capable of operating at different clock frequencies.

Figure 2:
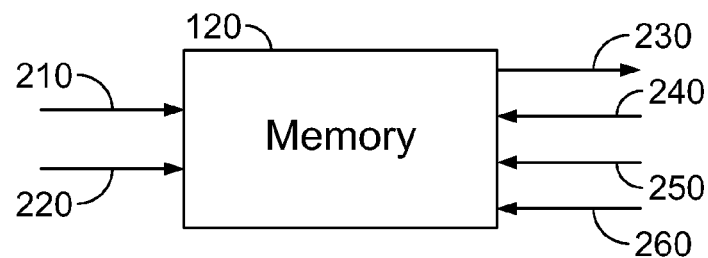
FIG. 2 is a simplified block diagram of a dual port memory, according to an illustrative embodiment.

FIG. 2 is a simplified block diagram of a dual port memory, according to an illustrative embodiment. In some implementations, memory 120 may be a 1D storage array. Memory 120 may be operative to receive data from fixed length streaming processing engine 110 via buses 210 and 220. Buses 210 and 220 may be part of bus 104 of FIG. 1. Bus 210 may be operative to transmit to memory 120, from fixed length streaming processing engine 110, addresses of memory locations that fixed length streaming processing engine 110 desires to write data to. Bus 220 may be operative to transmit to memory 120, from fixed length streaming processing engine 110, data that fixed length streaming processing engine 110 desires to write to memory 120.

Memory 120 may be connected to variable length processing engine 130 via buses 230, 240, 250, and 260. Buses 230 and 240, and buses 250 and 260, may respectively be part of buses 131 and 132 of FIG. 1. Buses 230 and 240 may be used by variable length processing engine 130 to read data from memory 120. More specifically, bus 240 may be operative to transmit to memory 120, from variable length processing engine 130, addresses of memory locations that variable length processing engine 130 desires to read data from. Bus 230 may be operative to transmit data from the memory locations specified by variable length processing engine 130 via bus 240 to variable length processing engine 130.

Buses 250 and 260 may be used by variable length processing engine 130 to write data to memory 120. More specifically, bus 250 may be operative to transmit to memory 120, from variable length processing engine 130, addresses of memory locations that variable length processing engine 130 desires to write data to. Bus 260 may be operative to transmit to memory 120, from variable length processing engine 130, data that variable length processing engine 130 desires to write to memory 120.

As discussed above, buses 230, 240, 250, and 260 may provide variable length processing engine 130 the ability to read and write data from memory 120 simultaneously. In some implementations, memory 120 may use reduced ports for reading and writing data and may be shared with external logic. For example, memory 120 may utilize single ports in combination with external logic. In some implementations, a ready/busy signal (not shown) may be used to acknowledge a module located before or after memory 120 to determine whether to continue reading or writing data from memory 120 or to temporarily pause reading or writing data from memory 120.

FIGS. 3A and 3B are simplified block diagrams of a 3D memory, according to an illustrative embodiment. In particular, memory 120 of FIG. 1 and FIG. 2 may be abstractly represented as a 3D memory of the form shown in FIGS. 3A and 3B. FIG. 3A shows an exemplary embodiment in which memory 120 of FIG. 1 may be represented as a 3D cube 300. Cube 300 may be symmetric. The three axes of cube 300 may be indicated by axes X 310, Y 320, and Z 330. Cube 300 may merely be an abstract representation of memory 120, i.e., memory 120 may not be structured as cube 300 in architectural implementations.

FIG. 3B shows a cross-sectional view of cube 300 of FIG. 3A illustrating a manner in which the internal structure of cube 300 may be configured. FIG. 3B shows a representation of cube 300 cross-sectioned along axis X 310. For example, cube 300 may include cross-section slices 340, 350, 360, and 370. Cross-section slices 340, 350, 360, and 370 may each be a planar memory structure containing memory locations 380. Slices 340, 350, 360, and 370 may be stacked next to each other in some implementations. Cube 300 may include additional slices (not shown) similar to slices 340, 350, 360, and 370. Each memory location 380 may be capable of storing a data sample. In some implementations, each data sample may be a sub-carrier sample.

FIG. 3B shows that in some implementations, each slice 340, 350, 360, and 370 may be able to store 12×12 data samples. For example, memory locations in each slice 340, 350, 360, and 370 may be indexed from 0:11 in each dimension as shown in FIG. 3B. Accordingly, memory locations in cube 300 may be indexed using vector coordinate notation for ease of representation. For example, the memory location at coordinates (X=0, Y=0, Z=0) may be denoted by the notation (0,0,0). For example, the memory location at coordinates (X=0, Y=11, Z=0) may be denoted by the notation (0,11,0). A sequence of memory locations in cube 300 may accordingly be denoted by using the above notation. For example, a sequence of memory locations along column 390 of slice 340 may be denoted by (0,0,0), (1,0,0), (2,0,0), ... (11,0,0) or equivalently by [X=0:11, Y=0, Z=0]. For example, a sequence of memory locations along the first row of slice 340 may be denoted by (0,0,0), (0,1,0), (0,2,0), ... (0,11,0) or equivalently by [X=0, Y=0:11, Z=0].

Because cube 300 is a representation of memory 120, each memory location in cube 300 may correspond to a memory address in memory 120. For example, memory location (0,0,0) may correspond to a particular memory address in memory 120. The size of slices 340, 350, 360, and 370 shown in FIG. 3B is merely illustrative and memory slices capable of storing additional or fewer data samples may be utilized in some implementations.

Figure 4C:
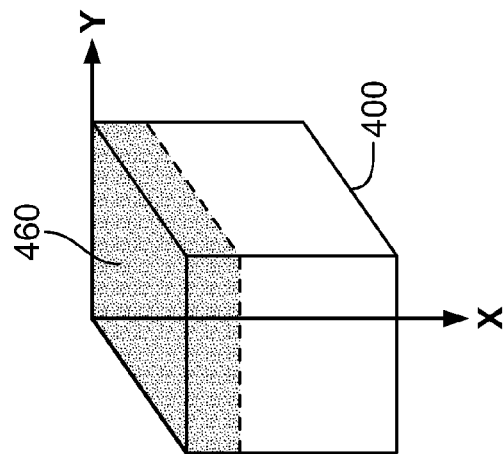
FIGS. 4A, 4B, and 4C are simplified block diagrams showing the manner in which data may be read from and written to a 3D memory, according to an illustrative embodiment.
Figure 4B:
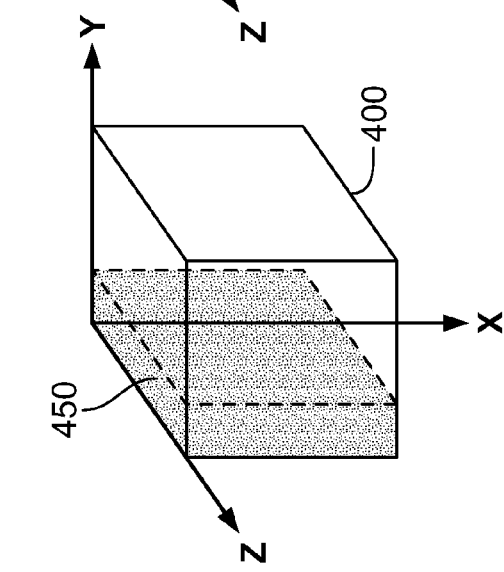
Figure 4A:
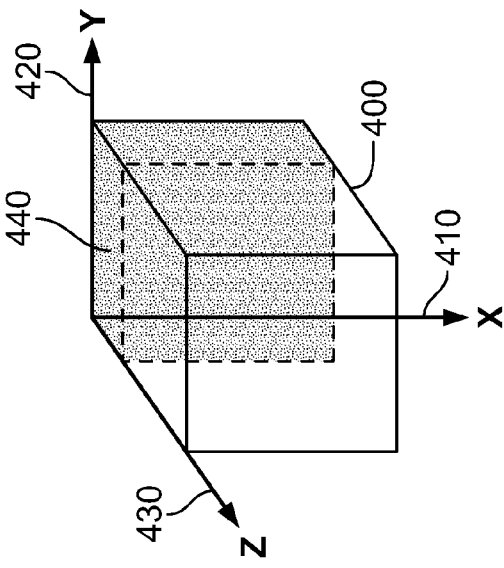

FIGS. 4A, 4B, and 4C are simplified block diagrams showing the manner in which data may be read from and written to a 3D memory, according to an illustrative embodiment. FIG. 4A shows cube 400 which is a representation of memory 120 of FIG. 1. Cube 400 may be substantially identical to cube 300 of FIG. 3A. The three axes of cube 400 may be indicated by axes X 410, Y 420, and Z 430. As an example, FIGS. 4A, 4B, and 4C show how data may be read from and written to cube 400 when variable length processing engine 130 uses radix R=12 during FFT computations. Radix R=12 is used frequently during FFT computations required in the LTE standard. However, other values of the radix may also be used.

FIG. 4A shows that variable length processing engine 130 may initially write data to memory block 440. Memory block 440 may correspond to the set of memory locations denoted by:

$$[X = 0, \ Y = 0{:}11, \ Z = 0], \quad (1)$$
$$[X = 1, \ Y = 0{:}11, \ Z = 0],$$
$$\vdots$$
$$[X = 11, \ Y = 0{:}11, \ Z = 0].$$

Memory block 440 may be substantially similar to slice 340 of FIG. 3B. Moreover, equation (1) may indicate the order in which data are written to memory locations in memory block 440. For example, the first data sample may be written to memory location (0,0,0), the second data sample may be written to memory location (0,1,0), and the twelfth data sample may be written to memory location (0,11,0). In other words, the first twelve data samples may be written to memory locations [X=0, Y=0:11, Z=0]. The next twelve data samples may be written to memory locations [X=1, Y=0:11, Z=0], starting from memory location (1, 0, 0), and so on. Data samples 132 to 144 may be written to memory locations [X=11, Y=0:11, Z=0].

Subsequently, in a manner similar to that described above in connection with memory block 440, data may be written to a memory block that corresponds to slice 350 of FIG. 3B, as indicated below by the memory locations denoted by:

$$[X = 0, \ Y = 0{:}11, \ Z = 1], \quad (2)$$
$$[X = 1, \ Y = 0{:}11, \ Z = 1],$$
$$\vdots$$
$$[X = 11, \ Y = 0{:}11, \ Z = 1].$$

Subsequently, data may be written to memory locations denoted by: [X=0, Y=0:11, Z=2], [X=0, Y=0:11, Z=2], ..., [X=0, Y=0:11, Z=2], and so on. Proceeding in this manner, data may eventually be written to memory locations denoted by:

$$[X = 0, \ Y = 0{:}11, \ Z = 11], \quad (3)$$
$$[X = 1, \ Y = 0{:}11, \ Z = 11],$$
$$\vdots$$
$$[X = 11, \ Y = 0{:}11, \ Z = 11].$$

Equations (1)-(3) indicate the order in which data may be written to memory locations in cube 400. It may not necessarily be that all memory locations in cube 400 are filled with data because variable length processing engine 130 which writes data to memory 120 (represented by cube 400) may be computing a variable length FFT. The data written to memory locations denoted by equations (1)-(3) may correspond to sub-carrier samples whose IDFT may need to be computed. Writing data to cube 400 in the order specified by equations (1)-(3) is represented by the notation Y-X-Z, i.e., the data is first written along axis Y 420, followed by axis X 410, and lastly data is written along axis Z 430.

FIG. 4B shows an illustrative example of the manner in which data may be read from cube 400. Reading of data in this manner may correspond to reading data for performing computations for a second stage of an IDFT being computed by variable length processing engine 130.

FIG. 4B shows that variable length processing engine 130 may initially read data from memory block 450. Memory block 450 may correspond to the set of memory locations denoted by:

$$[X = 0:11, \quad Y = 0, \quad Z = 0], \qquad (4)$$
$$[X = 0:11, \quad Y = 0, \quad Z = 1],$$
$$\vdots$$
$$[X = 0:11, \quad Y = 0, \quad Z = 11].$$

Equation (4) may indicate the order in which data are read from memory locations in memory block 450. For example, the first data sample may be read from memory location (0,0,0), the second data sample may be read from memory location (1,0,0), and the twelfth data sample may be read from memory location (11,0,0). In other words, the first twelve data samples may be read from memory locations [X=0:11, Y=0, Z=0]. The next twelve data samples may be read from memory locations [X=0:11, Y=0, Z=1], starting from memory location (0, 0, 1), and so on. Data samples 132 to 144 may be read from memory locations [X=0:11, Y=0, Z=11].

Subsequently, data may be read from memory locations denoted by:

$$[X = 0:11, \quad Y = 1, \quad Z = 0], \qquad (5)$$
$$[X = 0:11, \quad Y = 1, \quad Z = 1],$$
$$\vdots$$
$$[X = 0:11, \quad Y = 1, \quad Z = 11].$$

Still further, data may be read from memory locations denoted by:

$$[X = 0:11, \quad Y = 11, \quad Z = 0], \qquad (6)$$
$$[X = 0:11, \quad Y = 11, \quad Z = 1],$$
$$\vdots$$
$$[X = 0:11, \quad Y = 11, \quad Z = 11].$$

Reading data from cube 400 in the order specified by equations (4)-(6) is represented by the notation X-Z-Y, i.e., the data is first read along axis X 410, followed by axis Z 430, and lastly data is read along axis Y 420.

Once data has been read from memory block 450, memory block 450 may be released or freed up, i.e., memory locations in memory block 450 may be used for storing other data. The process by which memory block (or slices) are released is described further in connection with FIG. 7 below.

In particular, as explained in greater detail in connection with FIGS. 5A, 5B, and 5C below, once memory locations in memory block 450 are released, they may be used for storing other data. Specifically, the order in which memory locations of cube 400 are used to store data may be identical to the order in which data is read from memory locations in cube 400 as described in connection with FIG. 4B. For example, data may be written to cube 400 in the order X-Z-Y, i.e., the data is first written along axis X 410, followed by axis Z 430, and lastly data is written along axis Y 420.

In other words, data may be written to the set of memory locations denoted by:

$$[X = 0:11, \quad Y = 0, \quad Z = 0], \qquad (7)$$
$$[X = 0:11, \quad Y = 0, \quad Z = 1],$$
$$\vdots$$
$$[X = 0:11, \quad Y = 0, \quad Z = 11].$$

For example, the first data sample may be written to memory location (0,0,0), the second data sample may be written to memory location (1,0,0), and the twelfth data sample may be written to memory location (11,0,0). In other words, the first 12 data samples may be written to memory locations [X=0:11, Y=0, Z=0]. The next twelve data samples may be written to memory locations [X=0:11, Y=0, Z=1], starting from memory location (0, 0, 1), and so on. Data samples 132 to 144 may be written to memory locations [X=0:11, Y=0, Z=11].

Subsequently, data may be written to memory locations denoted by:

$$[X = 0:11, \quad Y = 1, \quad Z = 0], \qquad (8)$$
$$[X = 0:11, \quad Y = 1, \quad Z = 1],$$
$$\vdots$$
$$[X = 0:11, \quad Y = 1, \quad Z = 11].$$

Still further, data may be written to memory locations denoted by:

$$[X = 0:11, \quad Y = 11, \quad Z = 0], \qquad (9)$$
$$[X = 0:11, \quad Y = 11, \quad Z = 1],$$
$$\vdots$$
$$[X = 0:11, \quad Y = 11, \quad Z = 11].$$

FIG. 4C shows an illustrative example of the manner in which data may be read from cube 400. Reading of data in this manner may correspond to reading data for performing computations for a third stage of an IDFT being computed by variable length processing engine 130.

FIG. 4C shows that variable length processing engine 130 may initially read data from memory block 460. Memory block 460 may correspond to the set of memory locations denoted by:

$$[X = 0, \quad Y = 0, \quad Z = 0:11], \qquad (10)$$
$$[X = 0, \quad Y = 1, \quad Z = 0:11],$$
$$\vdots$$
$$[X = 0, \quad Y = 11, \quad Z = 0:11].$$

Equation (10) may indicate the order in which data are read from memory locations in memory block 460. For example, the first data sample may be read from memory location (0,0,0), the second data sample may be read from memory location (0,0,1), and the twelfth data sample may be read from memory location (0,0,11). In other words, the first 12 data samples may be read from memory locations [X=0, Y=0, Z=0:11]. The next twelve data samples may be read from memory locations [X=0, Y=1, Z=0:11], starting from memory location (0, 1, 0), and so on. Data samples 132 to 144 may be read from memory locations [X=0, Y=11, Z=0:11].

Subsequently, data may be read from memory locations denoted by:

$$[X = 1, \; Y = 0, \; Z = 0:11],$$
$$[X = 1, \; Y = 1, \; Z = 0:11],$$
$$\vdots$$
$$[X = 1, \; Y = 11, \; Z = 0:11]. \quad (11)$$

Still further, data may be read from memory locations denoted by:

$$[X = 11, \; Y = 0, \; Z = 0:11],$$
$$[X = 11, \; Y = 1, \; Z = 0:11],$$
$$\vdots$$
$$[X = 11, \; Y = 11, \; Z = 0:11]. \quad (12)$$

Reading data from cube 400 in the order specified by equations (10)-(12) is represented by the notation Z-Y-X, i.e., the data is first read along axis Z 430, followed by axis Y 420, and lastly data is read along axis X 410.

Once memory locations in memory block 460 are released, they may be used for storing other data. Specifically, the order in which memory locations of cube 400 are used to store data may be identical to the order in which data is read from memory locations in cube 400 as described in connection with FIG. 4C. For example, data may be written to cube 400 in the order Z-Y-X, i.e., the data is first written along axis Z 430, followed by axis Y 420, and lastly data is written along axis X 410.

Subsequently, data may be read from memory block 440 as shown in FIG. 4A in the order specified Y-X-Z, i.e., the data is first read along axis Y 420, followed by axis X 410, and lastly data is read along axis Z 430. Memory block 440 may correspond to the set of memory locations denoted by:

$$[X = 0, \; Y = 0:11, \; Z = 0],$$
$$[X = 1, \; Y = 0:11, \; Z = 0],$$
$$\vdots$$
$$[X = 11, \; Y = 0:11, \; Z = 0].$$

The process of reading and writing data to cube 400, as discussed above in connection with FIGS. 4A, 4B, and 4C is further elaborated below in FIGS. 5A, 5B, and 5C by means of an example.

Figure 5A:
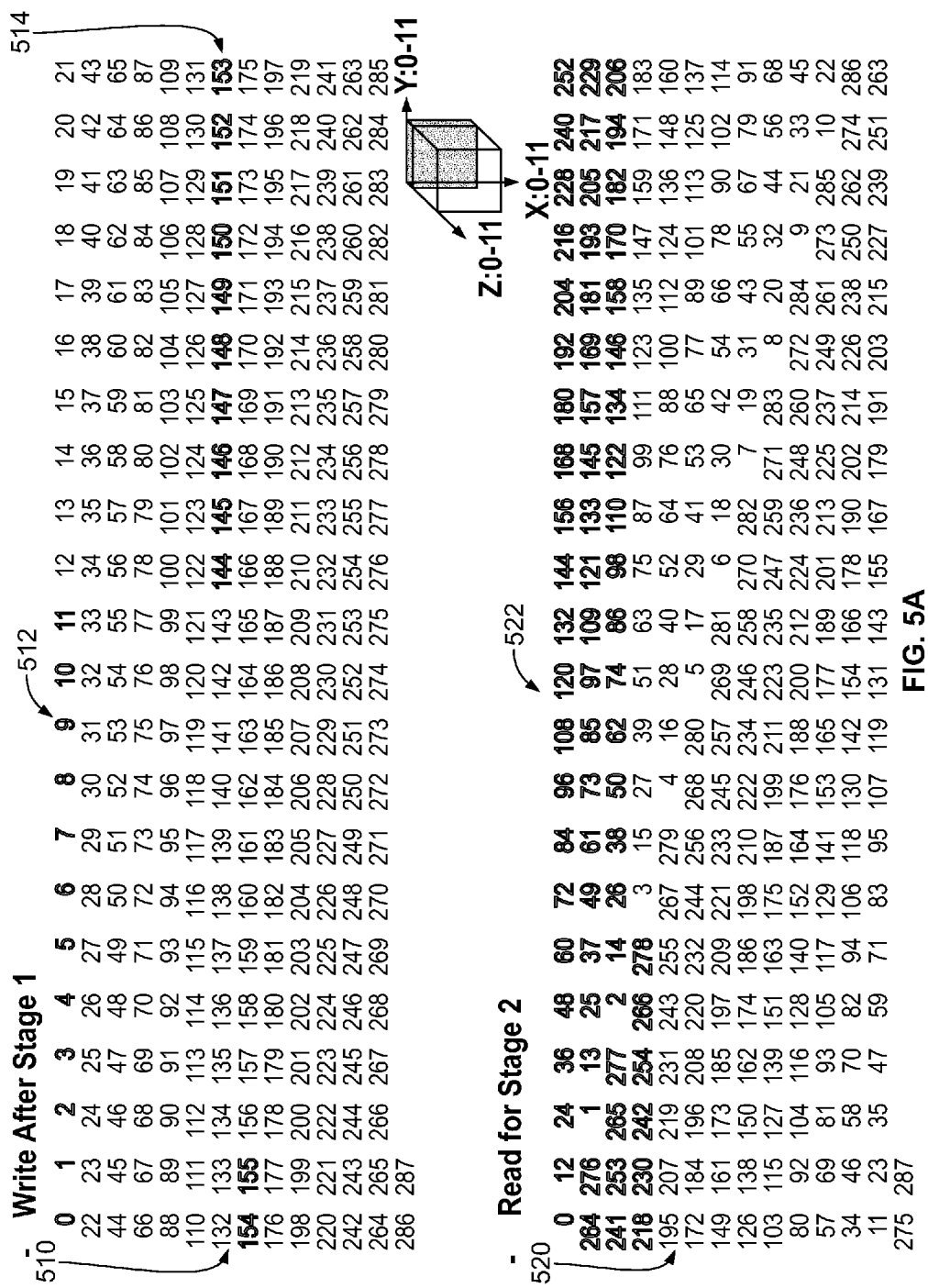
Figure 5B:
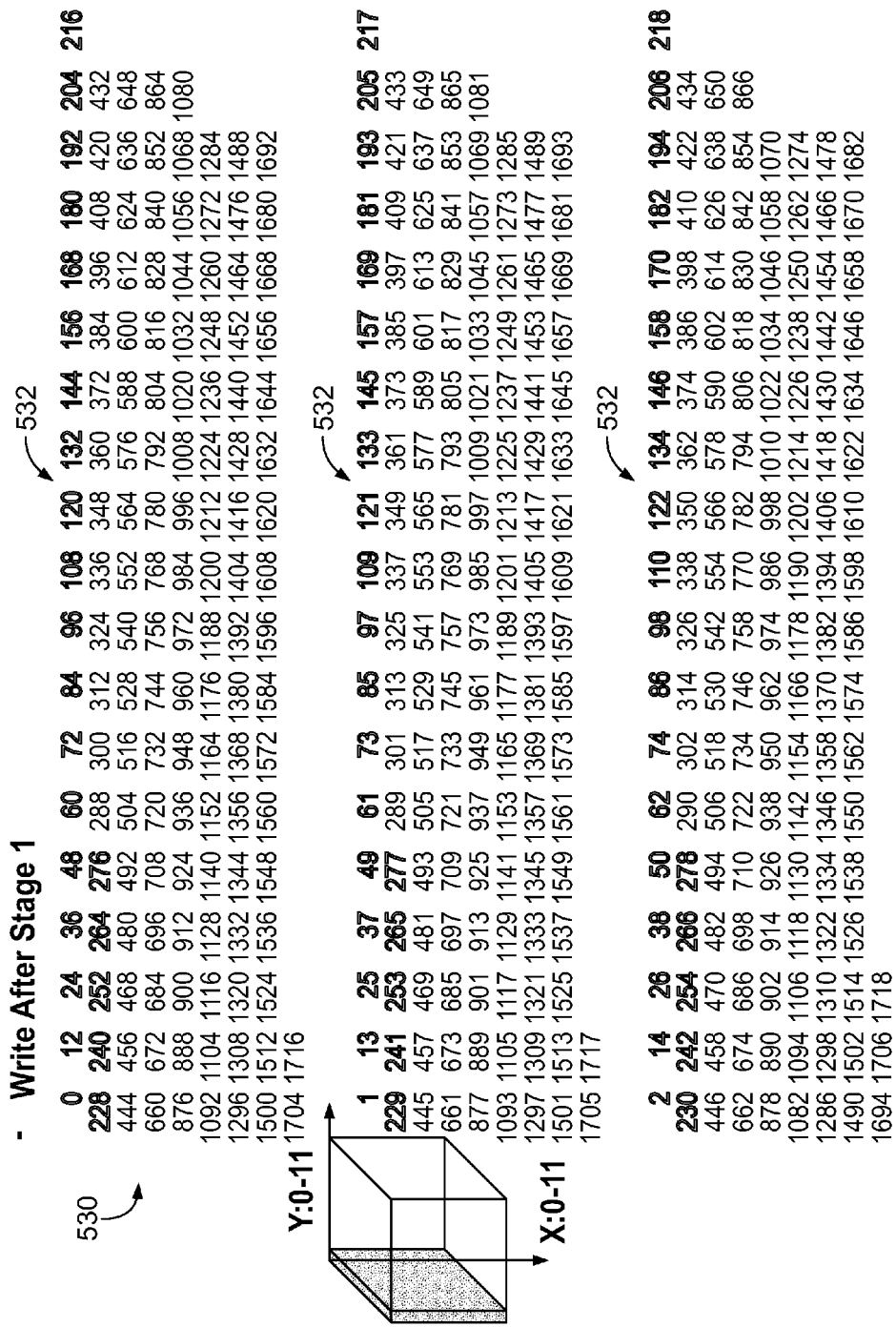
Figure 5C:
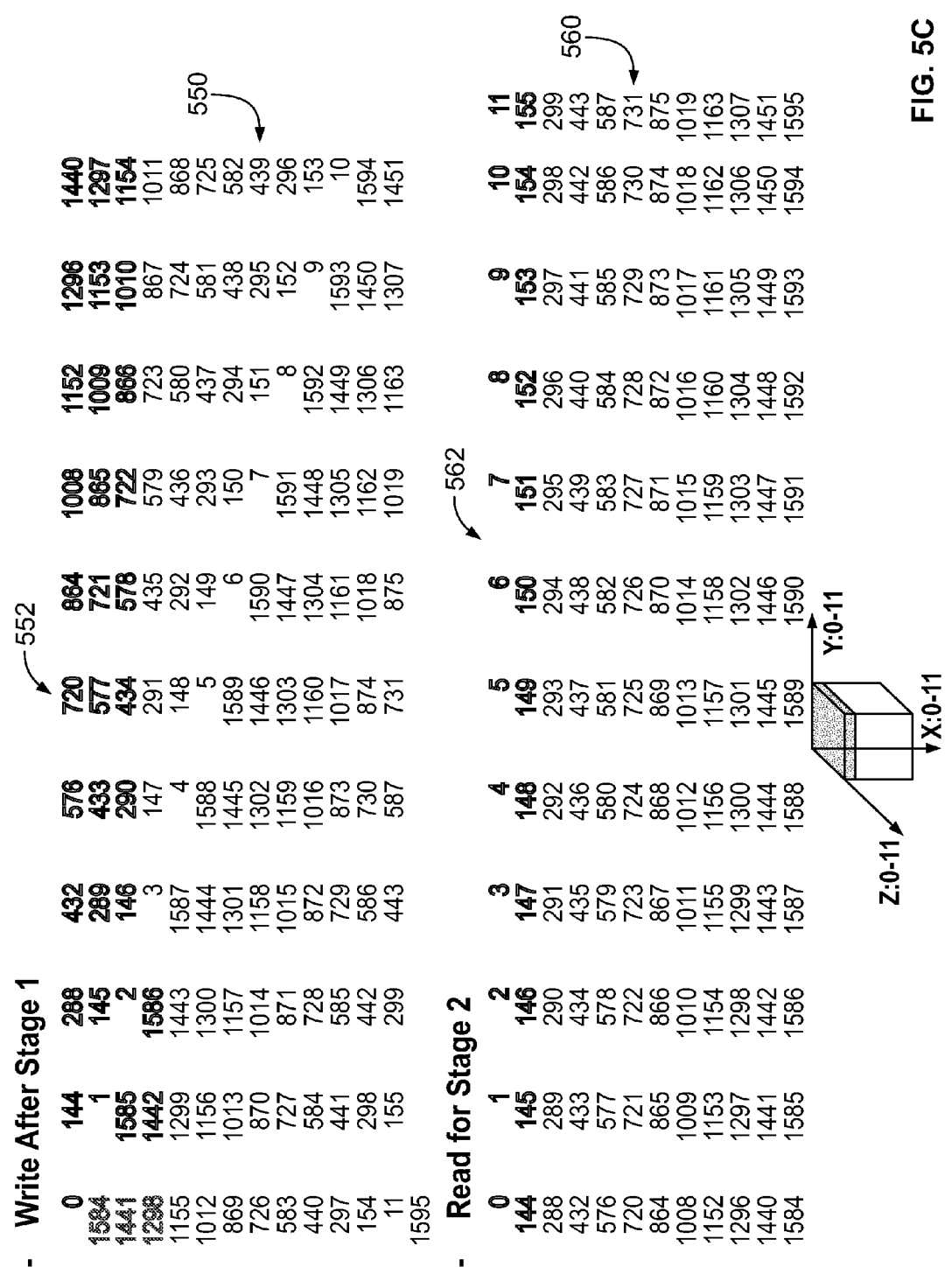

FIGS. 5A, 5B, and 5C are simplified tables showing the manner in which data may be read from and written to a 3D memory, according to an illustrative embodiment. As an example, FIGS. 5A, 5B, and 5C show how data may be read from and written to cube 400 of FIG. 4A when variable length processing engine 130 uses radix R=12 during FFT computations. Other values of the radix may also be used.

FIG. 5A shows tables 510 and 520 of indices of data samples. In an illustrative example, variable length processing engine 130 may be computing a variable length FFT where the frame length of an initial data frame may be 12×24=288 data samples. In a first stage, variable length processing engine 130 may write data samples corresponding to the initial frame to memory 120. Table 510 lists indices of data samples in the sequence in which the data samples may be stored in cube 400 of FIG. 4A which is a representation of memory 120. Mapping of memory locations in cube 400 to memory locations in memory 120, and the subsequent generation of addresses corresponding to memory locations in memory 120 is described below in connection with FIGS. 6 and 7.

Table 510 lists indices of data samples in the sequence in which the data samples may be stored in cube 400 of FIG. 4A. In particular, variable length processing engine 130 may write data samples to cube 400 in the same sequence as specified in connection with FIG. 4A. Specifically, variable length processing engine 130 may write the first data sample memory location (0,0,0), the second data sample to memory location (0,1,0), and the twelfth data sample to memory location (0,11,0). In other words, the first twelve data samples, indicated in table 510 as data samples 512, may be written to memory locations [X=0, Y=0:11, Z=0]. The next twelve data samples may be written to memory locations [X=1, Y=0:11, Z=0], starting from memory location (1, 0, 0), and so on. Data samples 132 to 144 may be written to memory locations [X=11, Y=0:11, Z=0]. This order is represented by: [X=0, Y=0:11, Z=0], [X=1, Y=0:11, Z=0], . . . , [X=11, Y=0:11, Z=0].

Subsequently, data may be written to memory locations denoted by: [X=0, Y=0:11, Z=1], [X=1, Y=0:11, Z=1], . . . , [X=11, Y=0:11, Z=1], followed by the memory locations denoted by: [X=0, Y=0:11, Z=2], [X=0, Y=0:11, Z=2], . . . , [X=0, Y=0:11, Z=2], and so on. Writing data to cube 400 in the order specified above is represented by the notation Y-X-Z, i.e., the data is first written along axis Y 420, followed by axis X 410, and lastly data is written along axis Z 430.

In a second stage of the FFT computation, variable length processing engine 130 may read data samples corresponding to the initial frame from memory 120. Table 520 lists indices of data samples in the sequence in which the data samples may be read from cube 400 of FIG. 4A. In particular, variable length processing engine 130 may read data samples to cube 400 in the same sequence as specified in connection with FIG. 4B.

Specifically, variable length processing engine 130 may read a first data sample from memory location (0,0,0), the second data sample may be read from memory location (1,0,0), and the twelfth data sample may be read from memory location (11,0,0). In other words, the first twelve data samples may be read from memory locations [X=0:11, Y=0, Z=0]. Furthermore, as shown in table 520, reading data samples from cube 400 in this sequence corresponds to reading data samples with indices are 0, 12, 24, 36, 48, 60, 72, 84, 96, 108, 120, and 132. This sequence of indices of data samples is referred to as the radix-reversed sequence in literature and is the sequence in which the data samples may be processed by variable length processing engine 130 during the second stage of the FFT computation. Accordingly, it is advantageous that the sequence of memory locations of cube 400 from which data samples are read may result in reading data samples in the order in which they may be processed by variable length processing engine 130.

The next twelve data samples may be read from memory locations [X=0:11, Y=0, Z=1], starting from memory location (0, 0, 1), and so on. Subsequently, data may be read from memory locations denoted by: [X=0:11, Y=1, Z=0], [X=0:11, Y=1, Z=1], ..., [X=0:11, Y=1, Z=11]. Still further, data may be read from memory locations denoted by: [X=0:11, Y=11, Z=0], [X=0:11, Y=11, Z=1], ..., [X=0:11, Y=11, Z=11]. Reading data from cube 400 in the order specified above is represented by the notation X-Z-Y, i.e., the data is first read along axis X 410, followed by axis Z 430, and lastly data is read along axis Y 420.

Variable length processing engine 130 may read data samples from cube 400 in the sequence specified above until variable length processing engine 130 has read the data sample with index 278. The sequence of data samples with indices 0, 12, 24, ..., 254, 266, 278 is denoted by sequence 522 in table 520. Once the data samples in sequence 522 have been read by variable length processing engine 130, the memory locations in which the read data samples were stored may be released. The released memory locations may then be utilized by cube 400 for storage of other data as described below in connection with FIG. 5B.

Continuing the previous example, variable length processing engine 130 may be computing a variable length FFT where the frame length of an initial data frame may be 12×36=432 data samples. In a first stage, variable length processing engine 130 may write data samples corresponding to the initial frame to memory 120.

FIG. 5B shows tables 530 and 540 of indices of data samples. Table 530 lists indices of data samples in the sequence in which the data samples may be stored in cube 400 of FIG. 4A. The order in which memory locations of cube 400 are used to store data may be identical to the order in which data is read from memory locations in cube 400 as described in connection with table 520 of FIG. 5A. For example, data may be written to cube 400 in the order X-Z-Y, i.e., the data is first written along axis X 410, followed by axis Z 430, and lastly data is written along axis Y 420. After the completion of these three write phases, the state of the memory (i.e., cube 400) returns to the first stage described above in connection with FIG. 5A.

Figure 6:
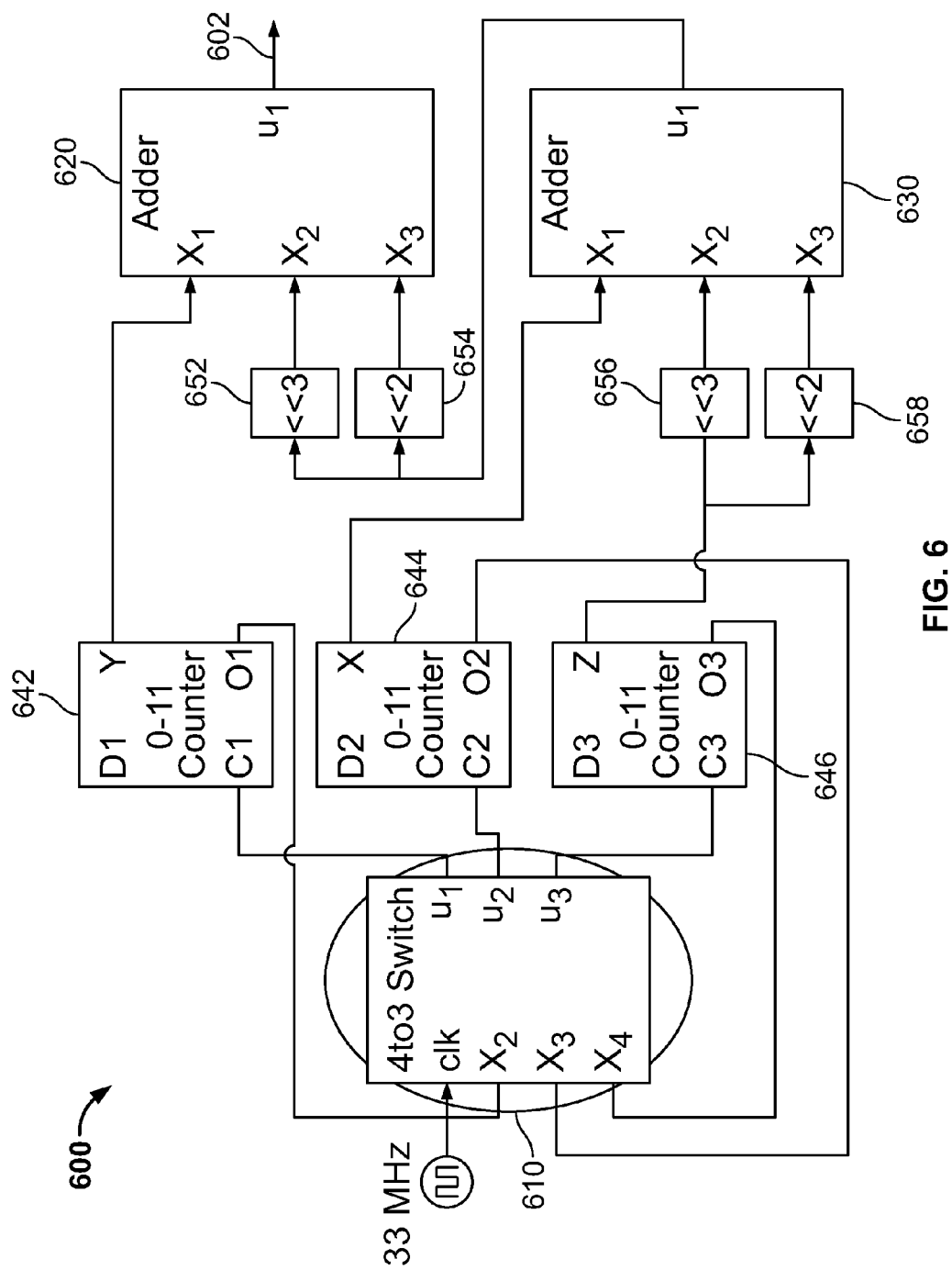
FIG. 6 is a simplified block diagram of an addressor circuit that may be used to generate addresses for the buffer, according to an illustrative embodiment.

FIG. 6 is a simplified block diagram of an addressor circuit that may be used to generate addresses for the buffer, according to an illustrative embodiment. System 600 includes adders 620 and 630, counters 642, 644, and 646, switch 610, and shift registers 652, 654, 656, and 658. Lead 602 may output a memory address to buses 210, 230 or 250 of FIG. 2. In some implementations, clock 612 may be an external 33 MHz clock signal, although clock 612 may also be a clock signal running at other frequencies. Clock 612 may be operable to clock all the components of system 600.

Counters 642, 644, and 646 may each be associated with one of coordinates X, Y, or Z of cube 300 of FIG. 3A. For example, as shown in FIG. 6, counters 642, 644, and 646 may respectively be associated with coordinates Y, X, and Z. In an illustrative example, where cube 300 may be operable to store 12×12×12=1728 data samples, twelve data samples may be stored along each dimension X, Y, and Z of cube 300. Accordingly, as shown in FIG. 3B, memory locations along each dimension in cube 300 may be indexed from 0, 1, ..., 11 and each memory location in cube 300 may be represented by coordinates (X, Y, Z), where X, Y, and Z each run from index value 0 to index value 11. Continuing this example, system 600 may be configured to compute any of equations 12(12Z+X)+Y, 12(12X+Y)+Z, or 12(12Y+Z)+X and output the result of the computation via lead 602. The value output on lead 602 may correspond to a memory address in the buffer. Thus, system 600 may map a memory location in cube 300 to a memory address in the buffer. System 600 may be operable to generate both read and write memory addresses in the buffer in this manner.

Counters 642, 644, and 646 may be cyclic counters each operable to each output a value between 0 to 11 on respective outputs—Y of counter 642, X of counter 644, and Z of counter 646. Counters 642, 644, and 646 may all have an initial and/or default internal value of 0. Counters 642, 644, and 646 may output overflow signals O1, O2, and O3 respectively. Overflow signal O1 may be a binary valued signal that may have a logic-low value when counter 642 outputs values from 0 to 11 on output Y of counter 642. Once counter 642 outputs value 11 on output Y of counter 642, counter 642 may reset its internal counter to value 0 and simultaneously output a logic-high value for overflow signal O1. Overflow signals O2 and O3, corresponding respectively to counters 644 and 646, may exhibit similar behavior as overflow signal O1. The initial and/or default value of overflow signals O1, O2, and O3 may be a logic-low value. Counters 642, 644, and 646 may each be coupled to switch 610 and overflow signals O1, O2, and O3 may respectively be received by switch 610 as inputs x2, x3, and x4. Counters 642, 644, and 646 may receive input signals C1, C2, and C3 respectively from switch 610.

Switch 610 may be coupled to clock 612 and to each of counters 642, 644, and 646. Switch 610 may output signals u1, u2, and u3 respectively to counters 642, 644, and 646. Counters 642, 644, and 646 may receive signals u1, u2, and u3 from switch 610 respectively as inputs C1, C2, and C3. Switch 610 may be configurable to connect any of the signals it receives as inputs, i.e., clock 612, x2, x3, and x4 to any of the signals it outputs, i.e., u1, u2, and u3. For example, switch 610 may initially be configured to connect clock 612 to output u1 (transmitted to counter 642), input x2 to output u2 (transmitted to counter 644), and input x3 to output u3 (transmitted to counter 646).

Accordingly, in a first time slot in which clock 612 toggles after system 600 is powered-up, switch 610 may feed clock 612 through to counter 642 via output u1. In response to receiving the clock toggle, counter 642 may increment its internal value from 0 to 1 and output a value of 1 on output Y of counter 642. In the first time slot, the values of overflow signals O1 of counter 642 and O2 of counter 644 may be logic-low and therefore, counters 644 and 646 may receive logic-low values at respective inputs C2 and C3. Accordingly, the internal state of counters 644 and 646 may remain at 0 in the first time slot.

In subsequent time slots, switch 610 may continue to feed clock 612 to counter 642, and counter 642 may increment its internal state by a unit value in each time slot that clock 612 toggles and may output the value of the internal state on output Y of counter 642. Until the internal state of counter 642 reaches value 11, counter 642 may continue to output a logic-low value on overflow signal O1. Once the internal state of counter 642 reaches value 11, counter 642 may roll over its internal state to value 0 and toggle the value of overflow signal O1.

When switch 610 receives a toggle on input x2 from counter 642, switch 610 may feed that toggle, via output u2, to input C2 of counter 644. Accordingly, counter 644 may increment its internal state by a unit value to a value of 1 and may output the value of its internal state on output X of counter 644. The value of overflow signal O2 of counter 644 may be logic-low because the internal state of counter 644 has not reached a value 11 yet and accordingly counter 646 may receive a logic-low value at inputs C3. The internal state of counter 646 may therefore remain at 0 in this time slot because counter 646 may not receive a toggle value on input C3.

In the next 11 time slots, switch 610 may continue to feed clock 612 to counter 642, and counter 642 may increment its internal state by a unit value in each time slot that clock 612 toggles and may output the value of the internal state on output Y of counter 642. During these time slots, counter 644 may output the value of its internal state, i.e., 1, on output X of counter 644. Counter 646 may output the value of its internal state, i.e., 0, on output Z of counter 646. When the internal state of counter 642 reaches value 11, counter 642 may roll over its internal state to value 0 and toggle the value of overflow signal O1. Accordingly, counter 644 may receive a toggle on input C2 and may accordingly increment its internal state by a unit value to a value of 2 and may output the value of its internal state on output X of counter 644.

The process described above may be repeated such that the values output by counters 642, 644, and 646 respectively on outputs Y of counter 642, output X of counter 644, and output Z of counter 646 are as indicated below in Table 1.

TABLE 1

| | | | | Time slot | | | | | | |
|---|---|---|---|---|---|---|---|---|---|---|
| 1 | 2 | ... | 12 | 13 | 14 | ... | 24 | ... | 132 | 133 | ... | 144 |
| Y | 0 | 1 | ... | 11 | 0 | 1 | ... | 11 | ... | 0 | 1 | ... | 11 |
| X | 0 | 0 | ... | 0 | 1 | 1 | ... | 1 | ... | 11 | 11 | ... | 11 |
| Z | 0 | 0 | ... | 0 | 0 | 0 | ... | 0 | ... | 0 | 0 | ... | 0 |

After the $144^{th}$ time slot, when the internal state of counter 642 may have reached value 11 (as shown in TABLE 1), counter 642 may roll over its internal state to value 0 and toggle the value of overflow signal O1. Additionally, the internal state of counter 644 may have reached value 11 and counter 644 may roll over its internal state to value 0. Counter 644 may additionally toggle the value of overflow signal O2 which may be received by switch 610 at input x3.

When switch 610 receives a toggle on input x3 from counter 644, switch 610 may feed that toggle, via output u3, to input C3 of counter 646. Accordingly, counter 646 may increment its internal state by a unit value to a value of 1 and may output the value of its internal state on output Z of counter 646. The process described above may be repeated such that the values output by counters 642, 644, and 646 respectively on outputs Y of counter 642, output X of counter 644, and output Z of counter 646 are as indicated below in Table 2.

TABLE 2

| | | | Time slot | | | | | | |
|---|---|---|---|---|---|---|---|---|---|
| 1 | ... | 144 | 145 | ... | 288 | 289 | ... | 432 | ... | 1728 |
| Y | 0 | ... | 11 | 0 | ... | 11 | 0 | ... | 11 | ... | 11 |
| X | 0 | ... | 11 | 0 | ... | 11 | 0 | ... | 11 | ... | 11 |
| Z | 0 | ... | 0 | 1 | ... | 1 | 2 | ... | 2 | ... | 11 |

The above example is merely illustrative and depicts the case where cube 300 may be operable to store 12×12×12=1728 data samples. Cube 300 may be operable to store more or less than 1728 data samples and the values of the indices in TABLES 1 and 2 may change correspondingly.

Shift registers 656 and 658 may be operable to left shift their respective inputs by 3 and 2 bits respectively. The operation of left shifting an input may be equivalent to multiplying the input, e.g., left shifting the input value by 3 bits may be equivalent to multiplying the input value by 8 and left shifting the input value by 2 bits may be equivalent to multiplying the input value by 4.

In the illustrative embodiment shown in FIG. 6, system 600 may be configured to compute the equation 12(12Z+X)+Y. Accordingly, shift registers 656 and 658 may both receive output Z from counter 646 and shift Z by 3 bits and 2 bits respectively. Shift registers 656 and 658 may be connected to adder 630. From shift registers 656 and 658 respectively, adder 630 may receive output Z from counter 646 that has been left shifted by 3 bits (i.e., multiplied by 8) and output Z from counter 646 that has been left shifted by 2 bits (i.e., multiplied by 4). Adder 630 may additionally receive output X from counter 644. Adder 630 may compute 12Z+X based on the inputs it receives. Adder 630 may output the value computed for 12Z+X to shift registers 652 and 654.

Shift registers 652 and 654 may be substantially similar to shift registers 656 and 658 respectively. Accordingly, shift registers 652 and 654 may both receive output 12Z+X from adder 630 and shift 12Z+X by 3 bits and 2 bits respectively. Shift registers 652 and 654 may be connected to adder 620. From shift registers 652 and 654 respectively, adder 620 may receive 12Z+X left shifted by 3 bits (i.e., multiplied by 8) and 12Z+X left shifted by 2 bits (i.e., multiplied by 4). Adder 620 may additionally receive output Y from counter 642. Adder 620 may compute 12(12Z+X)+Y based on the inputs it receives. Adder 620 may output the value computed for 12(12Z+X)+Y via lead 602.

The above example is merely illustrative and depicts the case where system 600 is configured to compute equation 12(12Z+X)+Y. In other embodiments, system 600 may be configured to compute equations 12(12X+Y)+Z or 12(12Y+Z)+X. Switch 610 may reconfigure its internal connections dynamically when system 600 may be configured to compute equations 12(12Z+X)+Y, 12(12X+Y)+Z, or 12(12Y+Z)+X.

In some implementations, system 600 of FIG. 6 may include a state machine (not shown) operable to control the reconfiguration of switch 610. For example, the state machine may control which of equations 12(12Z+X)+Y, 12(12X+Y)+Z, or 12(12Y+Z)+X is computed by system 600. As discussed above in connection with FIGS. 4A, 4B, and 4C, data samples may be read from or written to memory locations in cube 300 in the order Y-X-Z, X-Z-Y, or Z-Y-X. When data samples are read from or written to memory locations in cube 300 in the order Y-X-Z, system 600 may compute memory addresses in the buffer by computing equation 12(12Z+X)+Y. When data samples are read from or written to memory locations in cube 300 in the order X-Z-Y, system 600 may compute memory addresses in the buffer by computing equation 12(12Y+Z)+X. When data samples are read from or written to memory locations in cube 300 in the order Z-Y-X, system 600 may compute memory addresses in the buffer by computing equation 12(12X+Y)+Z. The state machine may control the configuration of switch 610 such that system 600 computes the equation corresponding to whether data samples are supposed to be read from or written to memory locations in cube 300 in the order Y-X-Z, X-Z-Y, or Z-Y-X.

Figure 7:
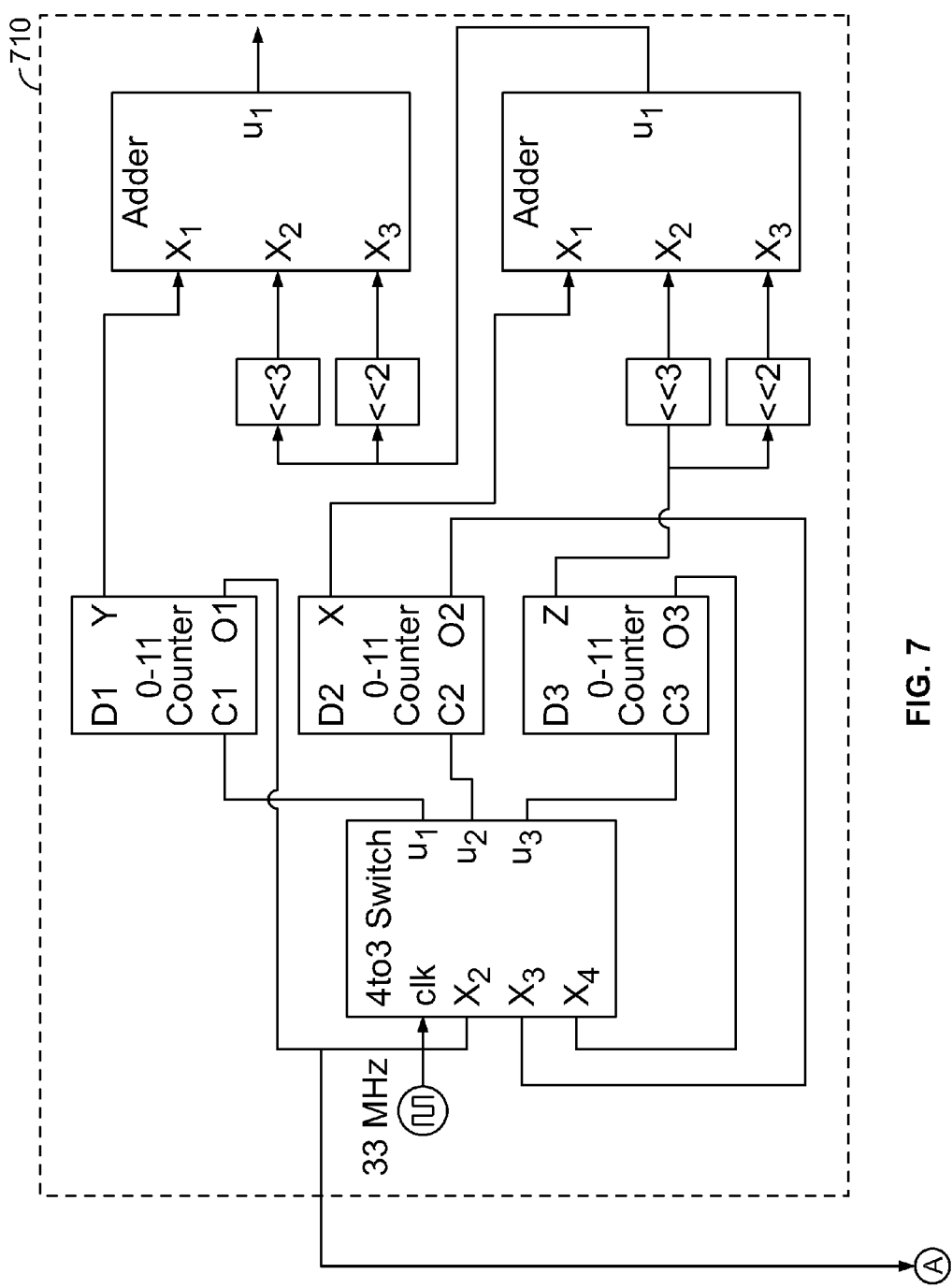
FIG. 7 is a simplified block diagram of an addressor circuit that may be used to generate addresses for the buffer using backpressure, according to an illustrative embodiment.
Figure 7:
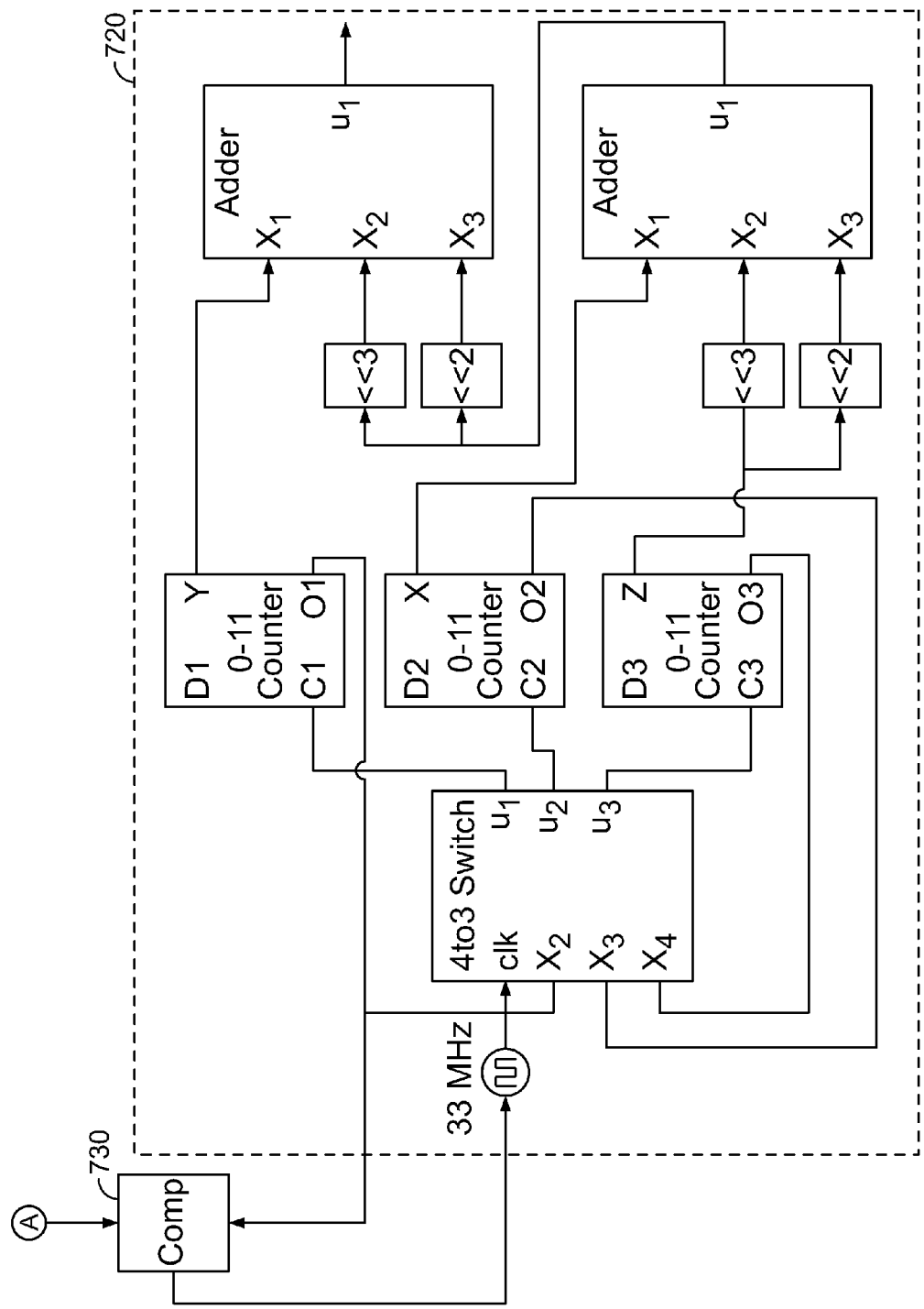

FIG. 7 is a simplified block diagram of an addressor circuit that may be used to generate addresses for the buffer using backpressure, according to an illustrative embodiment. System 700 includes circuits 710 and 720 and comparator 730. Each of circuits 710 and 720 may be substantially identical to system 600 described above in connection with FIG. 6. Comparator 730 may be connected to circuit 710 and circuit 720 via leads 732 and 734 respectively.

In an implementation, circuit 710 may be operable to generate read addresses for the buffer while circuit 720 may be operable to generate write addresses for the buffer.

In this manner, data samples may be read from and written to different memory addresses in the buffer simultaneously. The simultaneous reading from and writing to of data samples in the buffer may proceed in the manner described above in connection with FIGS. 4A, 4B, and 4C.

Comparator 730 may be operable to generate a binary valued backpressure signal operable to ensure that read memory addresses generated by circuit 710 do not overlap with write memory addresses generated by circuit 720. Comparator 730 may output the backpressure signal on lead 740 which may be connected to circuit 720 as shown in FIG. 7. Lead 740 may be connected to a clock operable to supply a clock signal to circuit 720. The backpressure signal may equivalently be a clock enable signal, i.e., when the backpressure signal has a logic-high value the clock of circuit 720 may be activated and when the backpressure signal has a logic-low value the clock of circuit 720 may be disabled. When the clock of circuit 720 is disabled, computations of circuit 720 may temporarily be paused. In this way, if comparator 730 determines that the write address is in conflict with the read address (e.g., the write address is ahead of the read address or the write address is a memory location from which data has not yet been read) then the logic-low value backpressure signal may prevent circuit 720 from generating additional write addresses. If comparator 730 determines that the write address is not in conflict with the read address, comparator 730 may generate a logic-high backpressure signal activating the clock of circuit 720.

Comparator 730 may be operable to generate the backpressure signal by comparing the memory read address received from circuit 710 via lead 732 to the memory write address received from circuit 720 via lead 734. Based on the read address, comparator 730 may determine whether the memory slice of cube 300 which contains the received memory address has been released, i.e., data samples have already been read from it. As described above in connection with FIGS. 4A, 4B, and 4C, if a memory slice has been released, that memory slice is then free to have other data samples written to it.

Figure 8:
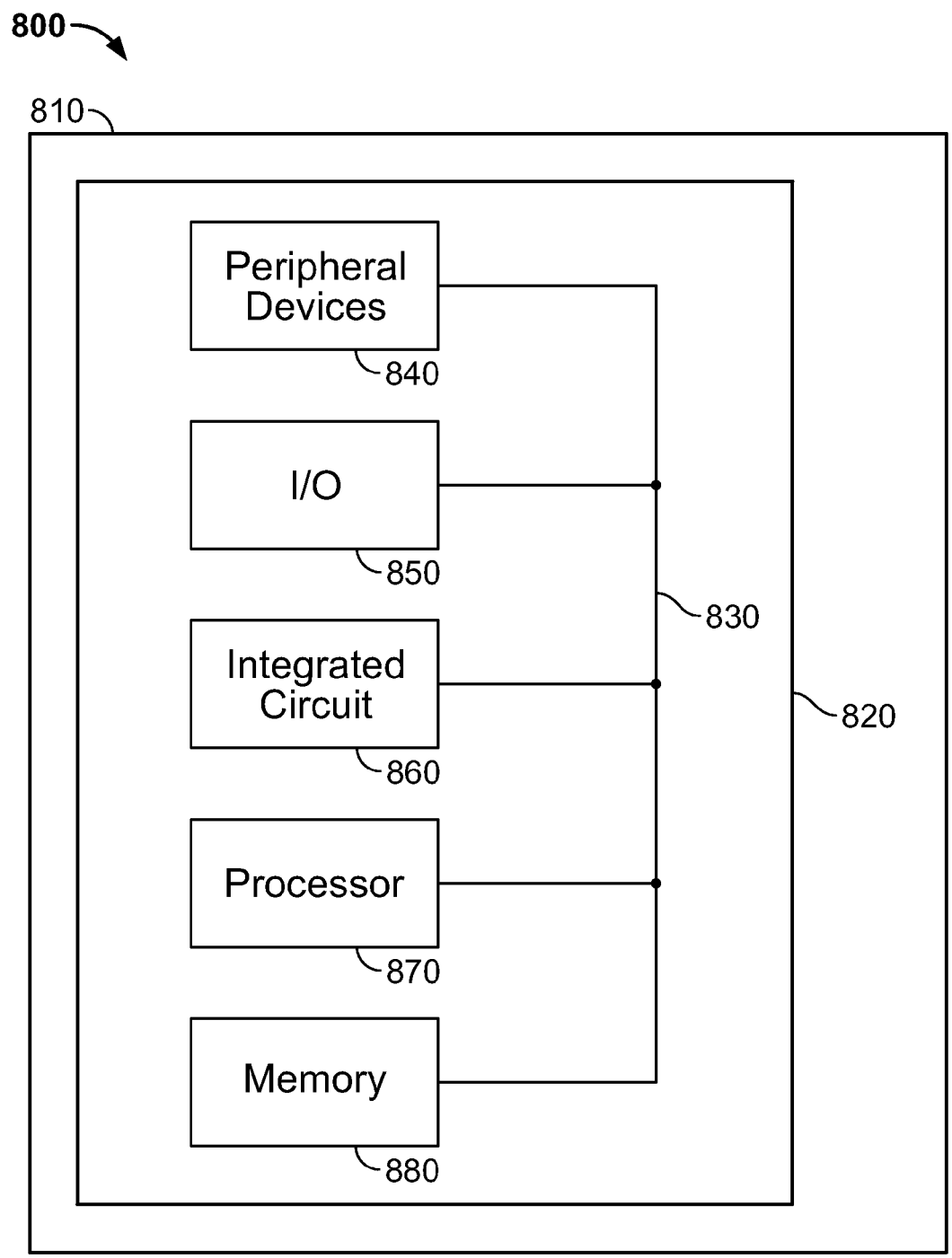
FIG. 8 illustrates a circuit or other device that includes embodiments of the circuits described herein as being within a data processing system.

FIG. 8 illustrates a circuit or other device that includes embodiments of the delay determination circuits described herein as being within a data processing system 800. In an embodiment, the circuit or device may be an integrated circuit, application specific standard product (ASSP), application specific integrated circuit (ASIC), programmable logic device (PLD), full-custom chip, or dedicated chip. In an embodiment, circuit 860 may be substantially similar to circuit 100. Data processing system 800 can include one or more of the following components: a processor 870, memory 880, I/O circuitry 880, and peripheral devices 840. These components are connected together by a system bus or other interconnections 830 and are populated on a circuit board 820 which is contained in an end-user system 810.

System 800 could be used in a wide variety of applications, such as computer networking, data networking, instrumentation, video processing, digital signal processing, or any other application where the advantage of using programmable or reprogrammable logic is desirable. Circuit 860 can be used to perform a variety of different logic functions. For example, circuit 860 can be configured as a processor or controller that works in cooperation with processor 870. Circuit 860 may also be used as an arbiter for arbitrating access to a shared resource in system 800. In yet another example, circuit 860 can be configured as an interface between processor 870 and one of the other components in system 800. It should be noted that system 800 is only exemplary, and that the true scope and spirit of the invention should be indicated by the following claims.

Although components in the above disclosure are described as being connected with one another, they may instead be connected to one another, possibly via other components in between them. It will be understood that the foregoing are only illustrative of the principles of the invention, and that various modifications can be made by those skilled in the art without departing from the scope and spirit of the invention. One skilled in the art will appreciate that the present invention can be practiced by other than the described embodiments, which are presented for purposes of illustration and not of limitation, and the present invention is limited only by the claims that follow.

What is claimed is:

1. A system for mapping memory locations of a 3D memory to a buffer, the system comprising circuitry for:
   determining a first geometric pattern for storing data in the 3D memory based on a type of computation performed using the data as input;
   storing the data in the 3D memory using the determined first geometric pattern;
   mapping memory locations arranged in the first geometric pattern in the 3D memory to first memory locations in the buffer;
   writing data to the first memory locations in the buffer;
   mapping memory locations arranged in a second geometric pattern in the 3D memory to second memory locations in the buffer, wherein the memory locations in the second geometric pattern in the 3D memory overlap with the memory locations in the first geometric pattern in the 3D memory;
   reading data from the second memory locations in the buffer after writing data to the first memory locations in the buffer; and
   writing data to the second memory locations in the buffer after reading data from the second memory locations in the buffer.

2. The system of claim 1, wherein the circuitry is further operative to:
   map memory locations arranged in a third geometric pattern in the 3D memory to third memory locations in the buffer, wherein the memory locations in the third geometric pattern in the 3D memory overlap with the memory locations in the second geometric pattern in the 3D memory;
   read data from the third memory locations in the buffer;
   write data to the third memory locations in the buffer after reading data from the third memory locations in the buffer; and
   read data from the first memory locations in the buffer after writing data to the third memory locations in the buffer.

3. The system of claim 2, wherein the:
   3D memory is a symmetric cube;
   first geometric pattern is a slice of the 3D memory along a first dimension of the symmetric cube;
   second geometric pattern is a slice of the 3D memory along a second dimension of the symmetric cube; and
   third geometric pattern is a slice of the 3D memory along a third dimension of the symmetric cube.

4. The system of claim 1, wherein mapping memory locations arranged in the first geometric pattern in the 3D memory further comprises generating memory addresses associated with the first memory locations in the buffer based on corresponding memory locations arranged in the first geometric pattern in the 3D memory.

5. The system of claim 1, wherein the first memory locations in the buffer and the second memory locations in the buffer are locked.

6. The system of claim 1, wherein the second memory locations in the buffer are released in response to reading data from the second memory locations in the buffer.

7. The system of claim 2, wherein the size of the symmetric cube is selected to store a number of data samples substantially corresponding to a size of a largest data frame.

8. The system of claim 1, wherein the circuitry is further configured to generate a backpressure enable signal to control a rate at which data is streamed to the buffer.

9. A method for mapping memory locations of a 3D memory to a buffer, the method comprising:
 determining a first geometric pattern for storing data in the 3D memory based on a type of computation performed using the data as input;
 storing the data in the 3D memory using the determined first geometric pattern;
 mapping memory locations arranged in the first geometric pattern in the 3D memory to first memory locations in the buffer;
 writing data to the first memory locations in the buffer;
 mapping memory locations arranged in a second geometric pattern in the 3D memory to second memory locations in the buffer, wherein the memory locations in the second geometric pattern in the 3D memory overlap with the memory locations in the first geometric pattern in the 3D memory;
 reading data from the second memory locations in the buffer after writing data to the first memory locations in the buffer; and
 writing data to the second memory locations in the buffer after reading data from the second memory locations in the buffer.

10. The method of claim 9 further comprising:
 mapping memory locations arranged in a third geometric pattern in the 3D memory to third memory locations in the buffer, wherein the memory locations in the third geometric pattern in the 3D memory overlap with the memory locations in the second geometric pattern in the 3D memory;
 reading data from the third memory locations in the buffer;
 writing data to the third memory locations in the buffer after reading data from the third memory locations in the buffer; and
 reading data from the first memory locations in the buffer after writing data to the third memory locations in the buffer.

11. The method of claim 10, wherein the:
 3D memory is a symmetric cube;
 first geometric pattern is a slice of the 3D memory along a first dimension of the symmetric cube;
 second geometric pattern is a slice of the 3D memory along a second dimension of the symmetric cube; and
 third geometric pattern is a slice of the 3D memory along a third dimension of the symmetric cube.

12. The method of claim 9, wherein mapping memory locations arranged in the first geometric pattern in the 3D memory further comprises generating memory addresses associated with the first memory locations in the buffer based on corresponding memory locations arranged in the first geometric pattern in the 3D memory.

13. The method of claim 9, wherein the first memory locations in the buffer and the second memory locations in the buffer are locked.

14. The method of claim 9, wherein the second memory locations in the buffer are released in response to reading data from the second memory locations in the buffer.

15. The method of claim 10, wherein the size of the symmetric cube is selected to store a number of data samples substantially corresponding to a size of a largest data frame.

16. The method of claim 9 further comprising generating a backpressure enable signal to control a rate at which data is streamed to the buffer.

17. A system for generating addresses based on 3D memory for a buffer, the system comprising circuitry for:
 determining a first geometric pattern for storing data in the 3D memory based on a type of computation performed using the data as input;
 storing the data in the 3D memory using the determined first geometric pattern;
 mapping memory locations arranged in a first geometric pattern in the 3D memory to first memory locations in the buffer;
 generating memory addresses associated with the first memory locations in the buffer based on corresponding memory locations arranged in the first geometric pattern in the 3D memory;
 writing data to the first memory locations in the buffer;
 mapping memory locations arranged in a second geometric pattern in the 3D memory to second memory locations in the buffer;
 generating memory addresses associated with the second memory locations in the buffer based on corresponding memory locations arranged in the second geometric pattern in the 3D memory; and
 reading data from the second memory locations in the buffer after writing data to the first memory locations in the buffer.

18. The system of claim 17, wherein the first memory locations in the buffer and the second memory locations in the buffer are locked.

19. The system of claim 18, wherein the second memory locations in the buffer are released in response to reading data from the second memory locations in the buffer.

20. The system of claim 17, wherein the circuitry is further configured to generate a backpressure enable signal to control a rate at which data is streamed to the buffer.

* * * * *